US008979990B2

(12) United States Patent
Shooter et al.

(10) Patent No.: US 8,979,990 B2
(45) Date of Patent: Mar. 17, 2015

(54) DISPERSANT COMPOSITION

(75) Inventors: Andrew J. Shooter, Wilmslow (GB); Stuart N. Richards, Frodsham (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 279 days.

(21) Appl. No.: 13/642,256

(22) PCT Filed: Apr. 15, 2011

(86) PCT No.: PCT/US2011/032648
§ 371 (c)(1),
(2), (4) Date: Oct. 19, 2012

(87) PCT Pub. No.: WO2011/133415
PCT Pub. Date: Oct. 27, 2011

(65) Prior Publication Data
US 2013/0041071 A1    Feb. 14, 2013

Related U.S. Application Data

(60) Provisional application No. 61/327,301, filed on Apr. 23, 2010.

(51) Int. Cl.
| | | |
|---|---|---|
| C09D 7/12 | (2006.01) | |
| C09D 11/03 | (2014.01) | |
| C09D 11/037 | (2014.01) | |
| C09D 11/30 | (2014.01) | |
| C09D 11/322 | (2014.01) | |
| C09D 171/00 | (2006.01) | |
| C09D 179/02 | (2006.01) | |
| C09D 7/00 | (2006.01) | |
| C08G 73/02 | (2006.01) | |
| C08G 59/50 | (2006.01) | |

(52) U.S. Cl.
CPC .............. *C09D 7/125* (2013.01); *C09D 7/007* (2013.01); *C09D 11/037* (2013.01); *C09D 11/30* (2013.01); *C09D 11/322* (2013.01); *C08G 73/024* (2013.01); *C08G 59/504* (2013.01)
USPC .................. 106/31.89; 106/31.01; 106/31.13; 106/31.6; 106/31.75; 106/31.85; 347/100

(58) Field of Classification Search
None
See application file for complete search history.

(56) References Cited

U.S. PATENT DOCUMENTS

| | | | | |
|---|---|---|---|---|
| 5,464,924 A | * | 11/1995 | Silvis et al. | 528/102 |
| 5,962,093 A | * | 10/1999 | White et al. | 428/35.2 |
| 2005/0059794 A1 | * | 3/2005 | Glass et al. | 528/86 |
| 2008/0047462 A1 | * | 2/2008 | Klein et al. | 106/31.78 |
| 2008/0119613 A1 | * | 5/2008 | Klein et al. | 525/187 |
| 2009/0050331 A1 | * | 2/2009 | Mahler et al. | 166/372 |
| 2010/0227950 A1 | * | 9/2010 | Nguyen et al. | 523/400 |

FOREIGN PATENT DOCUMENTS

| | | |
|---|---|---|
| WO | 9413867 A1 | 6/1994 |
| WO | 2005113676 A1 | 12/2005 |
| WO | 2008018873 A1 | 2/2008 |

* cited by examiner

*Primary Examiner* — Michael J Feely
(74) *Attorney, Agent, or Firm* — Teresan W. Gilbert, Esq.; David M. Shold, Esq.

(57) ABSTRACT

The invention relates to a composition containing a polyepoxide with polyether lateral chains and pendant hydrocarbyl groups. The invention further relates to a composition containing a particulate solid, an organic or aqueous medium, and a polyepoxide with polyether lateral chains and pendant hydrocarbyl groups. The invention further relates to novel compounds, and the use of the polyepoxide with polyether lateral chains and pendant hydrocarbyl groups as a dispersant.

17 Claims, No Drawings

DISPERSANT COMPOSITION

CROSS REFERENCE TO RELATED APPLICATION

This application claims priority from PCT Application Serial No. PCT/US2011/032,648 filed on Apr. 15$^{th}$. 2011, which claims the benefit of U.S. Provisional Application No. 61/327,301 filed on Apr. 23, 2010.

FIELD OF INVENTION

The invention relates to a composition containing a polyepoxide with polyether lateral chains and pendant hydrocarbyl groups. The invention further relates to a composition containing a particulate solid, an organic or aqueous medium, and a polyepoxide with polyether lateral chains and pendant hydrocarbyl groups. The invention further relates to novel compounds, and the use of the polyepoxide with polyether lateral chains and pendant hydrocarbyl groups as a dispersant.

BACKGROUND OF THE INVENTION

Paints, inks and coatings are well established as a means of providing a protective coating layer to materials such as metals, alloys, composites, plastics, concrete, ceramic, wood, paper, and textile glass. Paints and inks use particulate solids such as pigments and fillers to provide colour. The paints and inks may be organic or aqueous-based. A variety of disclosures have discussed dispersants for paints and inks, in particular water-based or aqueous systems. These are summarised below.

International Patent Applications WO 2008/018873 A1 and WO 2005/113676 A1 both disclose water-soluble dispersants formed by reacting a monofunctional amine-terminated polyether with a glycidyl ether of a polyol. WO 2008/018873 further discloses utilising the water-soluble dispersants for non-aqueous and aqueous pigmented inks and coatings.

U.S. Pat. No. 6,506,821 discloses a self-dispersible curable epoxy resin composition containing a reaction product of: (a) 1.0 equivalent of epoxy resin; (b) 0.01 to 1.0 equivalent of polyhydric phenol; and (c) 0.005 to 0.5 equivalent of an amine/epoxy adduct formed by reacting: (i) an aromatic polyepoxide; and (ii) a polyoxyalkylenamine, in an equivalent ratio of from 1:0.10 to 1:0.28.

U.S. Pat. No. 4,421,906 discloses a water based epoxy resin composition. The epoxy resin is useful in protective coatings. The composition comprises a modified diglycidyl ether of a bisphenol A type epoxy resin with a polyamidopolyamine in aqueous medium. The diglycidyl ether of bisphenol A is modified by partial reaction with a polyoxyalkyleneamine. The polyamidopolyamine is prepared from dimer fatty acids and a polyamine.

U.S. Pat. No. 5,567,748 discloses a water miscible or soluble amine terminated resin useful as a curing agent comprising the reaction product of: A) a polyamine component comprising one or more hydrophilic poly(oxyalkylene) amines, and optionally one or more hydrophobic polyamines; B) a polyepoxide component comprising one or more diglycidyl ethers of a polyalkylene glycol, one or more diglycidyl ethers of a cycloalkylene glycol and optionally one or more hydrophobic polyglycidyl ethers, wherein the mixture is optionally advanced by an amine extender; C) optionally, a reactive diluent which is capable of reacting with an epoxy resin, and D) optionally, a catalyst for the reaction of an amine with an epoxy resin; wherein Component A is employed in an equivalent excess with respect to Component B such that the terminal moieties of the reaction product are amine moieties capable of reacting with an epoxy resin; the composition has an amine hydrogen equivalent weight of from 140 to 240; and the composition is water soluble or water miscible.

U.S. Pat. No. 6,077,884 discloses a blend of epoxy-amine adducts are useful as emulsifiers of aqueous epoxy resin dispersions comprises (A-1) one or more epoxy-amine adduct(s) obtained by the reaction of (i) one or more aromatic, cycloaliphatic or novolac epoxy compound(s) and (ii) one or more amine-terminated polyalkylene glycol(s) having a molecular weight of from 700-5000 and an ethylene oxide content of at least 60% by weight in an equivalent ratio of amine-terminated polyalkylene glycol(s) to epoxy compound(s) of from 0.01:1 to 0.9:1; (A-2) one or more epoxy-amine adduct(s) derived from the reaction of (i) one or more aliphatic epoxy compound(s) and (ii) one or more amine-terminated polyalkylene glycol(s) having a molecular weight of from 700-5000 and an ethyleneoxide content of at least 60% by weight in an equivalent ratio of amine-terminated polyalkylene glycol(s) to epoxy compound(s) of from 0.01:1 to 0.9:1; (B-1) aromatic, cycloaliphatic or novolak polyglycidyl ethers; (B-2) optionally, polyglycidyl esters of aromatic or cycloaliphatic polycarboxylic acids; and (C) optionally, at least one of reactive thinners, pigments, filler or other additives.

U.S. Pat. No. 5,585,446 discloses epoxy resin composition is disclosed that contains compounds that contain at least two 1,2-epoxide groups. The epoxide group-containing compounds are reaction products of compounds (A1) that contain at least two 1,2-epoxide groups per molecule, compounds (A2) that are polyoxyalkylenemonoamines that have a molecular weight of from 130 to 900 and, if desired, polyoxyalkylenemonoamines (A3) that have a molecular weight of from 900 to 5000 and/or polycarboxylic acids (A4).

SUMMARY OF THE INVENTION

The inventors of this invention have discovered that the compositions disclosed herein are capable of at least one of enhanced mill base viscosity, and enhanced stability of aqueous dispersions, improved pigment dispersion, lower ink viscosity, increased pigment loading, and a lower degree of shear thinning after aging.

In one embodiment, the invention provides for a polymer comprising at least 1 to 100, or 1 to 50 repeat units, wherein the repeat units have structures (a) and (b) comprising:

(a) 5 to 60 (or 15 to 50) mole percent of repeat units represented by:

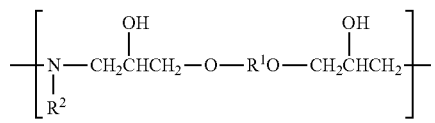

and
(b) 40 to 95 (or 50 to 85) mole percent of repeat units represented by:

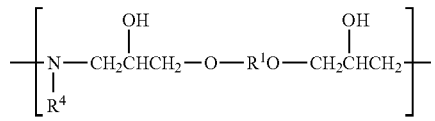

wherein
each $R^1$ may independently be $C_1$-$C_{100}$ hydrocarbyl group; and each $R^2$ may be represented by

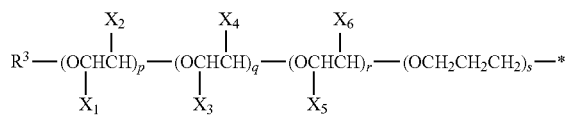

$R^3$ is independently selected from the group consisting of hydrogen, and any $C_1$ to $C_{24}$ hydrocarbyl group;

$X_1$, $X_2$, $X_3$, $X_4$, $X_5$, and $X_6$ may independently be selected from the group consisting of hydrogen, phenyl, methyl and ethyl, subject to the proviso that at least one of the two X groups that are attached to the same polyoxyalkylene oxyalkylene unit are hydrogen;

p, q, and r may each independently be any integer between zero and 100, including zero, subject to the proviso that at least one of p, q, and r is not zero;

$R^4$ may independently be a $C_{1-30}$, or $C_{6-24}$, or $C_{8-18}$ hydrocarbyl group (typically an alkyl or alkaryl, or aryl group); and s may be either 0 or 1.

Each $R^2$ may independently have a random or block structure.

The polymer may be terminated by a polymerisation terminating group such as hydrogen or alkyl, typically hydrogen.

In one embodiment, the invention polymer may be obtained/obtainable by a process comprising reacting an epoxide (typically a di-epoxide), a primary hydrocarbyl amine and polyoxyalkylene primary amine (typically polyetheramine).

In one embodiment, the invention provides a composition comprising a particulate solid (typically a pigment or filler), an organic or aqueous medium and a polymer disclosed herein.

In one embodiment, the invention provides a paint or ink comprising a particulate solid, a polar liquid, a film-forming resin and a polymer disclosed herein.

In one embodiment, the invention provides ink jet printing ink comprising a pigment, a polar liquid and a polymer disclosed herein.

In one embodiment, the invention provides a cartridge containing an ink jet printing ink, wherein the ink jet printing ink comprises a pigment, a polar liquid and a polymer disclosed herein.

In one embodiment, the invention provides for the use of and a polymer disclosed herein as a dispersant.

In one embodiment, the invention provides for the use of and a polymer disclosed herein as a dispersant in the compositions disclosed herein.

DETAILED DESCRIPTION OF THE INVENTION

The present invention provides a composition as disclosed herein above.

$R^1$ may be derivable from an epoxide, typically a di-epoxide, or mixtures thereof. The epoxide may be a glycidyl ether of a polyol. The epoxide may be linear, branched or cyclic. The epoxide may be aliphatic or aromatic, typically aromatic.

The epoxide may include diglycidyl ether bisphenol-A (DGEBA), diglycidyl ether tetrabromobisphenol-A, triglycidyl ether triphenol methane, triglycidyl ether triphenol ethane, tri-2,3-epoxy propyl isocyanurate, tetraglycidyl ether tetraphenol ethane, tetraglycidyl ether methylene dianiline, perglycidyl ether novolac resin and oligomers, or mixtures thereof.

The epoxide may be commercially available as DER331® Epoxy Resin from Dow Chemicals, or EPON® resins (such as EPON® resin 828) from Hexion Specialty Chemicals.

In one embodiment, at least 50 mole percent of $X^1$ to $X^6$ groups may be hydrogen resulting in the polyoxyalkylene oxyalkylene unit being an oxyethylene group.

In one embodiment, less than 50 mole percent of $X^1$ to $X^6$ groups may be hydrogen resulting in the polyoxyalkylene oxyalkylene unit being an oxypropylene group.

In one embodiment, $X^1$ to $X^6$ may independently be selected such that there is a mixture of hydrogen and methyl groups. The resultant polyoxyalkylene oxyalkylene units may be a mixture of oxyethylene and oxypropylene groups.

The $R^2$ group may be a residue of polyoxyalkylene primary amine (typically polyetheramine). The polyoxyalkylene primary amine may be commercially available as the Surfonamine® amines of from Huntsman Corporation. Specific examples of Surfonamine® amines are L-100 (propylene oxide to ethylene oxide mole ratio of 3:19), and L-207 (propylene oxide to ethylene oxide mole ratio of 10:32), L200 (propylene oxide to ethylene oxide mole ratio of 3:41), L-300 (propylene oxide to ethylene oxide mole ratio of 8:58). The figures in parentheses are approximate repeat units of propylene oxide, and ethylene oxide respectively. The repeat units of $R^2$ may vary randomly along the structure, be in blocks of similar units, or a random assortment of blocks of similar units.

In one embodiment, the $R^2$ group may be a polyoxyalkylene group, wherein the sum of p, q and r may be at least 9, at least 15, at least at least 25, or at least 30. The total of p, q and r may be up to 90, or up to 75 or up to 50. For example, the total of p, q and r may be 9 to 90, or 15 to 90, or 25 to 75 or 30 to 50.

$R^3$ may be derivable from a polymerisation initiator such as an alcohol. The alcohol may include methanol, ethanol, propanol, butanol, pentanol, hexanol, heptanol, octanol, 2-ethylhexanol, nonanol, decanol, dodecanol, tridecanol, butadecanol, pentadecanol, hexadecanol, heptadecanol, octadecanol, nonadecanol, eicosanol, pentaerthyritol, mannitol, sorbitol, glycerol, di-glycerol, tri-glycerol, tetra-glycerol, erythritol, 2-hydroxymethyl-2-methyl-1,3-propanediol (trimethylolethane), 2-ethyl-2-(hydroxymethyl)-1,3-propanediol (trimethylolpropane), 1,2,4-hexanetriol, or mixtures thereof.

When alcohol mixtures are employed to form $R^3$ group, the alcohol may for instance be Oxo Alcohol® 7911, Oxo Alcohol® 7900 and Oxo Alcohol® 1100 of Monsanto; Alphanol® 79 of ICI; Nafol® 1620, Alfol® 610 and Alfol® 810 of Condea (now Sasol); Epal® 610 and Epal® 810 of Ethyl Corporation; Linevol® 79, Linevol® 911 and Dobanol® 25 L of Shell AG; Liar) 125 of Condea Augusta, Milan; Dehydad® and Lorol® of Henkel KGaA (now Cognis) as well as Linopol® 7-11 and Acropol® 91 of Ugine Kuhlmann.

$R^4$ may be derivable from a primary amine of formula $R^4$—$NH_2$. $R^4$ may be a linear or branched hydrocarbyl group, typically an alkyl or alkaryl, or aryl group. $R^4$ may be derived from a primary linear or branched (typically a linear) amine having $C_{1-30}$, or $C_{6-24}$, or $C_{8-18}$ carbon atoms.

The primary amine may include methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, heptadecylamine, octadecylamine, nonadecylamine, eicosylamine, or mixtures thereof.

As described above, the polymer may be obtained/obtainable by a process comprising reacting an epoxide (typically a di-epoxide), a primary hydrocarbyl amine and a polyoxyalkylene primary amine (typically polyetheramine).

The mole ratio of epoxide to primary amine (primary hydrocarbylamine and polyoxyalkylene primary amine), may be from 1:1 to 1:2, or 1:1.05 to 1:1.3, or 1:1.1 to 1:1.2. The ratio of hydrocarbyl amine to polyoxyalkylene amine may be 1:20 to 20:1, or 5:1 to 1:5, or 2:1 to 1:2.

The process may have a reaction temperature in the range of 20 to 200° C., 40° C. to 120° C., or 60° C. to 100° C.

The process may be carried out in an inert atmosphere or air. If an inert atmosphere is used, the atmosphere may be nitrogen or argon.

The reaction may optionally be carried out in the presence of a solvent. Typically no solvent is necessary.

The solvent may include water or organic medium disclosed herein.

INDUSTRIAL APPLICATION

In one embodiment, the polymer disclosed herein disclosed herein is a dispersant, typically a particulate solid dispersant.

The polymer disclosed herein in different embodiments may be present in the composition of the invention in a range selected from 0.1 to 50 wt. %, or 0.25 to 35 wt. %, and 0.5 to 30 wt. %.

The particulate solid present in the composition may be any inorganic or organic solid material which is substantially insoluble in the organic medium. In one embodiment, the particulate solid is a pigment or filler.

In one embodiment, the composition of the invention provides a paint or ink including a particulate solid, an organic liquid, a binder and a polymer disclosed herein.

In one embodiment, the solid is an organic pigment from any of the recognised classes of pigments described, for example, in the Third Edition of the Colour Index (1971) and subsequent revisions of, and supplements thereto, under the chapter headed "Pigments". Carbon black, although strictly inorganic, behaves more like an organic pigment in its dispersing properties.

Examples of suitable solids are pigments for solvent inks; pigments, extenders and fillers for paints and plastics materials; disperse dyes; optical brightening agents and textile auxiliaries for solvent dyebaths, inks and other solvent application systems; solids for oil-based and inverse-emulsion drilling muds; dirt and solid particles in dry cleaning fluids, biocides, agrochemicals and pharmaceuticals which are applied as dispersions in organic solids; particulate ceramic materials; magnetic materials and magnetic recording media; fibres such as glass, steel, carbon and boron for composite materials.

Inorganic solids include: extenders and fillers such as talc, kaolin, silica, barytes and chalk, flame-retardant fillers such as alumina trihydrate, or magnesium hydroxide; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

In one embodiment, the pigment may be a phthalocyanine, or mixtures thereof. The phthalocyanine may for instance include phthalocyanine green pigment (Hostaperm Green GNX, ex Clariant), phthalocyanaine blue pigment (Monastral Blue BG ex ICI Chemicals), or phthalocyanine blue pigment (Lionel Blue FG7400G ex Toyo Ink MFG. Co., Ltd). The phthalocyanine pigments in many instances produce poor dispersions with high mill base viscosities (typically in alcohol/water media).

The organic medium present in the composition of the invention in one embodiment may be an aqueous or organic liquid. The organic liquid may be a non-polar or a polar organic liquid, although a polar organic liquid is typically used. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Such organic liquids generally have a hydrogen bonding number of 5 or more as defined in the above-mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40, and these liquids all fall within the scope of the term polar organic liquid as used herein.

In one embodiment, polar organic liquids include dialkyl ketones, alkyl esters of alkane carboxylic acids and alkanols, especially such liquids containing up to, and including, a total of 6 or 8 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alcohols such as methanol, ethanol, n-propanol, isopropanol, n-butanol and isobutanol and dialkyl and cyclic ethers such as diethyl ether and tetrahydrofuran. In one embodiment, solvents are alcohols, alkane carboxylic acids and esters of alkane carboxylic acids.

The polar organic liquids may include methanol, ethanol, n-propanol, isopropanol, n-butanol and isobutanol, or mixtures thereof.

Examples of organic liquids, which may be used as polar organic liquids are film-forming resins such as inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol oxyalkylene.

In one embodiment, non-polar organic liquids are compounds containing aliphatic groups, aromatic groups or mixtures thereof. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

The organic liquid may be an acrylate diluting monomer, wherein the acrylate diluting monomer is selected from the group consisting of acrylated epoxy soya oil, bisphenol A epoxy diacrylate, epoxy acrylate/monomer blends, acrylated epoxy linseed oil, nonyl phenol ethoxylate, 2-phenoxy ethyl acrylate, phenol ethoxylate monoacrylate, lauryl acrylate, hexadecyl acrylate, stearyl acrylate, nonyl phenol propoxylate (2.5) monoacrylate, myristyl acrylate, 1,6-hexanediol diacrylate, bisphenol A ethoxylate diacrylate, polyethylene glycol 200 diacrylate, tripropylene glycol diacrylate, neopentyl glycol propoxylate diacrylate, neopentyl glycol ethoxylate diacrylate, aliphatic ethoxylate diacrylate, aliphatic diacrylate, dipropylene glycol diacrylate, bisphenol A ethoxylate diacrylate, 1,6-hexanediol ethoxylate diacrylate, 1,6-hexanediol propoxylate diacrylate, trimethylolpropane triacrylate, trimethylolpropane propoxylate triacrylate, trimethylolpropane ethoxylate triacrylate, aliphatic diacrylate, ditrimethylolpropane tetraacrylate, dipentaerythitol pentaacrylate, aliphatic amine acrylate, aliphatic amine acrylate, tripropylene glycol diacrylate, glyceryl propoxylate triacrylate, trimethylolpropane propoxylate triacrylate, trimethylolpropane ethoxylate triacrylate, trimethylolpropane triacrylate, ditrimethylolpropane pentaacrylate, aliphatic urethane triacrylate, aliphatic urethane diacrylate, aromatic urethane hexaacrylate, aliphatic urethane diacrylate, aliphatic urethane triacrylate, aromatic urethane diacrylate, monomethoxy trimethylolpropane ethoxylate diacrylate and tripropylene glycol diacrylate.

In one embodiment, the organic liquid includes at least 0.1% by weight, or 1% by weight or more of a polar organic liquid based on the total organic liquid.

The organic liquid optionally further includes water. In one embodiment, the organic liquid is free of water.

When the organic liquid contains water, the amount present in one embodiment is not greater than 70%, or not greater than 50%, or not greater than 40% by weight based on the total amount of organic liquid plus water.

If desired, the compositions may contain other ingredients, for example, resins (where these do not already constitute the organic medium), binders, fluidising agents, anti-sedimentation agents, plasticisers, surfactants, anti-foamers, rheology modifiers, levelling agents, gloss modifiers and preservatives.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. Alternatively, the solid may be treated to reduce its particle size independently or in admixture with either, the organic medium or the dispersant, the other ingredient or ingredients then being added and the mixture being agitated to provide the composition.

In one embodiment, the composition of the present invention is suited to liquid dispersions. The dispersion may be a nano-dispersion (typically with a mean particle size of 100 nm or less), or a micro-dispersion (typically with a mean particle size of greater than 100 nm to 3 microns). In one embodiment, such dispersion compositions comprise: (a) 0.5 to 40 parts of a particulate solid, (b) 0.5 to 30 parts of a polymer disclosed herein, and (c) 30 to 99 parts of an organic or aqueous medium; wherein all parts are by weight and the amounts (a)+(b)+(c)=100.

In one embodiment, component a) includes 0.5 to 40 parts of a pigment and such dispersions are useful as liquid inks, paints and mill-bases. In one embodiment, component a) includes 0.5 to 40 parts of a pigment and such dispersions are useful as liquid inks.

If a composition is required including a particulate solid and a polymer disclosed herein in dry form, the organic liquid is typically volatile so that it may be readily removed from the particulate solid by a simple separation means such as evaporation. In one embodiment, the composition includes the organic liquid.

If the dry composition consists essentially of the polymer product disclosed herein and the particulate solid, it typically contains at least 0.2%, at least 0.5% or at least 1.0% the polymer based on weight of the particulate solid. In one embodiment, the dry composition contains not greater than 100%, not greater than 50%, not greater than 20%, or not greater than 10% by weight of the polymer disclosed herein based on the weight of the particulate solid. In one embodiment, the polymer disclosed herein is present at 0.6 wt % to 8 wt %.

As disclosed hereinbefore, the compositions of the invention are suitable for preparing mill-bases wherein the particulate solid is milled in an organic liquid in the presence of a polymer disclosed herein.

Thus, according to a still further embodiment of the invention, there is provided a mill-base including a particulate solid, an organic liquid and a polymer disclosed herein.

Typically, the mill-base contains from 20 to 70% by weight particulate solid based on the total weight of the mill-base. In one embodiment, the particulate solid is not less than 10 or not less than 20% by weight of the mill-base. Such mill-bases may optionally contain a binder added either before or after milling. The binder is a polymeric material capable of binding the composition on volatilisation of the organic liquid.

Binders may be polymeric materials including natural and synthetic materials. In one embodiment, binders include poly (meth)acrylates, polystyrenics, polyesters, polyurethanes, alkyds, polysaccharides such as cellulose, and natural proteins such as casein. In one embodiment, the binder is present in the composition at more than 100% based on the amount of particulate solid, more than 200%, more than 300% or more than 400%.

The amount of optional binder in the mill-base can vary over wide limits but is typically not less than 10%, and often not less than 20% by weight of the continuous/liquid phase of the mill-base. In one embodiment, the amount of binder is not greater than 50% or not greater than 40% by weight of the continuous/liquid phase of the mill-base.

The amount of dispersant in the mill-base is dependent on the amount of particulate solid but is typically from 0.5 to 5% by weight of the mill-base.

Dispersions and mill-bases made from the composition of the invention are suitable for use in coatings and paints both solvent-based and water-base, especially high solids paints; inks, especially offset, flexographic, gravure, radiation-curable, and screen inks; non-aqueous ceramic processes, especially tape-coating, doctor-blade, extrusion and injection moulding type processes, composites, cosmetics, adhesives and plastics materials. In one embodiment, the dispersions and mill-bases may be made from the composition of the invention for inks, especially offset, flexographic, gravure, radiation-curable, and screen inks.

In one embodiment, the composition of the invention further includes one or more additional known dispersants.

The following examples provide illustrations of the invention. These examples are non exhaustive and are not intended to limit the scope of the invention. All chemicals were purchased from Aldrich except where stated. The polymer is characterised by size exclusion chromatography relative to polystyrene standards.

EXAMPLES

Comparative Example 1 (COMPA1)

A round bottom flask is charged Sulfonamine®L-207 (100 parts ex Huntsman) and DER331 (16.4 parts, ex Dow Chemicals). DER31 is reported by Dow as the polyepoxide from reaction of Bisphenol A with epichlorohydrin, which has an epoxide equivalent weight of about 182-192 (g/eq) and is primarily the diglycidyl ether of bisphenol A (DGEBA) but includes about 10-15 mole % of higher molecular weight oligomers thereof (e.g. some molecules having two or more Bisphenol A based repeating units and three or more epichlorohydrin based repeating units per oligomer). The reaction mixture is held at 90° C. for 20 hours. The resulting product had Mn=5900 and Mw=9100. This product is similar to Preparative Example 5 of WO2005/113676

Example 1 (EX1)

A round bottom flask is charged Sulfonamine®L-207 (100 parts ex Huntsman) and DER331 (29.09 parts, ex Dow Chemicals), and dodecylamine (7.96 parts ex Aldrich). The reaction mixture is held at 90° C. for 20 hours. The resulting product had Mn=8500 and Mw=17,400.

Example 2 (EX2)

A round bottom flask is charged Sulfonamine®L-207 (100 parts ex Huntsman) and DER331 (29.09 parts, ex Dow Chemicals), and octadecylamine (11.57 parts ex Aldrich). The reaction mixture is held at 90° C. for 20 hours. The resulting product had Mn=7700 and Mw=16,500.

Example 3 (EX3)

A round bottom flask is charged Sulfonamine®L-207 (100 parts ex Huntsman) and DER331 (29.09 parts, ex Dow Chemicals), and octylamine (5.55 parts ex Aldrich). The reaction mixture is held at 90° C. for 20 hours. The resulting product had Mn=7500 and Mw=16,900.

Dispersion Evaluation Composition 1:

Dispersions are prepared by preparing mill-bases. The mill-bases are prepared by dissolving dispersants CE1, and Examples EX1 to EX3 (0.5 parts) in water (3 parts) and isopropyl alcohol (3 parts). 3 mm glass beads (20 parts) and pigment (3.5 parts) are added and the contents milled on a horizontal shaker for 16 hours. The pigments evaluated include Hostaperm Green GNX pigment (ex Clariant) and Monastral Blue BG pigment (ex ICI Chemicals). The dispersions formed are summarised as follows:

| Dispersant example used in mill base | Fluidity of dispersion based on Hostaperm Green GNX pigment | Fluidity of dispersion based on Monastral Blue BG pigment |
|---|---|---|
| CE1 | Immobile gel | Immobile gel |
| EX1 | Fluid | Fluid |
| EX2 | Fluid | Fluid |
| EX3 | Fluid | Fluid |

Dispersion Evaluation Composition 2:

Mill-base dispersions are prepared by dissolving dispersants CE1, and Examples EX1 to EX3 (0.9 parts) in water (7.6 parts). 3 mm glass beads (20 parts) and blue pigment (Lionel Blue FG7400G ex Toyo Ink, 1.5 parts) are added and the contents milled on a horizontal shaker for 16 hours. All the mill-bases exhibited excellent fluidity. The particle size (PS) of the mill bases were then determined on a Nanotrac® NPA251 particle size analyser. The average equivalent diameter D50 has been used to compare the particle size of the dispersions.

| Dispersant in Mill-base | PS Mill base D50 (nm) |
|---|---|
| CE1 | 160 |
| 1 | 160 |
| 2 | 160 |
| 3 | 180 |

The dispersions (5 parts) are then diluted with an ink solution comprising of water (16 parts), 2-pyrrolidinone (0.5 parts), 1,5-pentane diol (1.25 parts), glycerol (2.5 parts) Tego wet 500 (0.125 parts, ex Tego). The ink solutions are stored in an oven for 2 weeks at 70° C. and the particle size measured after 5, 8 and 14 days. The data obtained is:

| | PS Ink D50 (nm) | | | |
|---|---|---|---|---|
| Dispersant in Ink | Day 0 | Day 5 | Day 8 | Day 14 |
| CE1 | 150 | F.D. | F.D. | F.D. |
| 1 | 190 | 180 | 180 | 160 |
| 2 | 160 | 190 | 170 | 170 |
| 3 | 220 | 180 | 180 | 170 |

Footnote:
F.D. indicates that the dispersion flocculated (particle size after 5 days greater than 600 nm).

The data obtained from the tests above indicate that the compositions of the invention have at least one of enhanced mill base viscosity, and enhanced stability of aqueous dispersions over the compositions containing a comparative example dispersant.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(i) hydrocarbon substituents, that is, aliphatic (e.g., alkyl or alkenyl), alicyclic (e.g., cyclo alkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); and (iii) hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, an organic or aqueous medium wherein the medium is a polar liquid, a film-forming resin and a polymer comprising at least 1 to 100 repeat units, wherein the repeat units have structures (a) and (b) comprising:

(a) 5 to 60 mole percent of repeat units represented by:

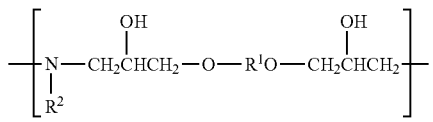

and (b) 40 to 95 mole percent of repeat units represented by:

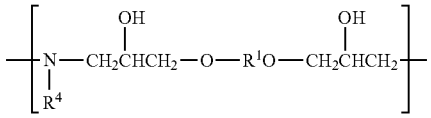

wherein
each $R^1$ is independently a $C_1$-$C_{100}$ hydrocarbyl group; and
each $R^2$ is represented by

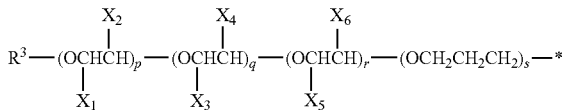

$R^3$ is independently selected from the group consisting of hydrogen, and any $C_1$ to $C_{24}$ hydrocarbyl group;
$X_1, X_2, X_3, X_4, X_5$, and $X_6$ is independently selected from the group consisting of hydrogen, phenyl, methyl and ethyl, subject to the proviso that at least one of the two X groups that are attached to the same polyoxyalkylene oxyalkylene unit are hydrogen;
p, q, and r are each independently any integer between zero and 100, including zero, subject to the proviso that at least one of p, q, and r is not zero;
$R^4$ is independently a $C_{1-30}$ hydrocarbyl group; and
s is either 0 or 1,
wherein the composition is a paint or ink composition.

2. The composition of claim 1, wherein the particulate solid is a pigment or filler.

3. The composition of claim 2, wherein pigment is a phthalocyanine, or mixtures thereof.

4. The composition of claim 1 wherein $X^1$ to $X^6$ are independently selected such that there is a mixture of hydrogen and methyl groups.

5. The composition of claim 1 wherein $R^2$ is a polyoxyalkylene group, wherein the sum of p, q and r is at least 25.

6. The composition of claim 1 wherein $R^2$ is a polyoxyalkylene group, wherein the total of p, q and r is up to 75.

7. The composition of claim 1 wherein $R^2$ is a polyoxyalkylene group, wherein the total of p, q and r is 30 to 50.

8. The composition of claim 1 wherein $R^4$ is derived from a primary linear or branched amine having $C_{8-18}$ carbon atoms.

9. The composition of claim 1, wherein the polymer is present from 0.5 to 30 wt %.

10. A composition comprising a particulate solid, an organic or aqueous medium and a polymer comprising at least 1 to 100 repeat units, wherein the repeat units have structures (a) and (b) comprising:

(a) 5 to 60 mole percent of repeat units represented by:

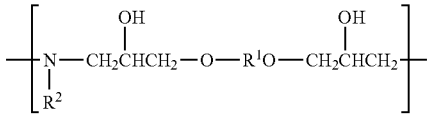

and (b) 40 to 95 mole percent of repeat units represented by:

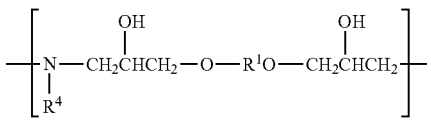

wherein
each $R^1$ is independently a $C_1$-$C_{100}$ hydrocarbyl group; and
each $R^2$ is represented by

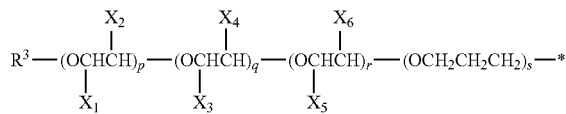

$R^3$ is independently selected from the group consisting of hydrogen, and any $C_1$ to $C_{24}$ hydrocarbyl group;

$X_1, X_2, X_3, X_4, X_5,$ and $X_6$ is independently selected from the group consisting of hydrogen, phenyl, methyl and ethyl, subject to the proviso that at least one of the two X groups that are attached to the same polyoxyalkylene oxyalkylene unit are hydrogen;

p, q, and r are each independently any integer between zero and 100, including zero, subject to the proviso that at least one of p, q, and r is not zero;

$R^4$ is independently a $C_{1-30}$ hydrocarbyl group; and
s is either 0 or 1, wherein the medium is a polar liquid, and wherein the particulate solid is a pigment and the composition is an ink jet printing ink.

11. The composition of claim 10, wherein $X^1$ to $X^6$ are independently selected such that there is a mixture of hydrogen and methyl groups.

12. The composition of claim 10, wherein $R^2$ is a polyoxyalkylene group, wherein the sum of p, q and r is at least 25.

13. The composition of claim 10, wherein $R^2$ is a polyoxyalkylene group, wherein the total of p, q and r is up to 75.

14. The composition of claim 10, wherein $R^2$ is a polyoxyalkylene group, wherein the total of p, q and r is 30 to 50.

15. The composition of claim 10 wherein $R^4$ is derived from a primary linear or branched amine having $C_{8-18}$ carbon atoms.

16. The composition of claim 10, wherein pigment is a phthalocyanine, or mixtures thereof.

17. The composition of claim 10, wherein the polymer is present from 0.5 to 30 wt %.

* * * * *